US012600277B2

(12) United States Patent
Haubrich et al.

(10) Patent No.: US 12,600,277 B2
(45) Date of Patent: Apr. 14, 2026

(54) BACKREST FOR A VEHICLE SEAT AND A METHOD FOR MOUNTING

(71) Applicant: Adient US LLC, Plymouth, MI (US)

(72) Inventors: Jörg Haubrich, Burscheid (DE);
Andrea Antonio Mose, Velbert (DE)

(73) Assignee: Adient US LLC, Plymouth, MI (US)

( * ) Notice: Subject to any disclaimer, the term of this patent is extended or adjusted under 35 U.S.C. 154(b) by 255 days.

(21) Appl. No.: 18/336,074

(22) Filed: Jun. 16, 2023

(65) Prior Publication Data

US 2023/0406176 A1     Dec. 21, 2023

(30) Foreign Application Priority Data

Jun. 16, 2022    (DE) ..................... 10 2022 206 084.9

(51) Int. Cl.
| | |
|---|---|
| B60N 2/68 | (2006.01) |
| B60N 2/64 | (2006.01) |
| B60N 2/809 | (2018.01) |
| B60N 2/882 | (2018.01) |

(52) U.S. Cl.
CPC ................. B60N 2/64 (2013.01); B60N 2/68 (2013.01); B60N 2/686 (2013.01); B60N 2/809 (2018.02); B60N 2/882 (2018.02)

(58) Field of Classification Search
CPC ................................... B60N 2/64; B60N 2/686
See application file for complete search history.

(56) References Cited

U.S. PATENT DOCUMENTS

| | | | | |
|---|---|---|---|---|
| 5,286,325 A | * | 2/1994 | Miyota | ................. B29C 63/025 |
| | | | | 156/212 |
| 10,081,282 B2 | * | 9/2018 | Line | ......................... B60N 2/72 |
| 10,427,570 B2 | * | 10/2019 | Haby | ....................... B60N 2/80 |
| 2015/0251579 A1 | * | 9/2015 | Line | .................... B60N 2/7011 |
| | | | | 297/452.38 |
| 2015/0321614 A1 | * | 11/2015 | Line | ......................... B60N 2/68 |
| | | | | 297/188.04 |
| 2018/0126886 A1 | | 5/2018 | Line et al. | |
| 2022/0227266 A1 | * | 7/2022 | Ofner | ....................... B60N 2/70 |
| 2023/0055017 A1 | * | 2/2023 | Steury | .................... B60N 2/682 |

FOREIGN PATENT DOCUMENTS

| | | |
|---|---|---|
| CN | 106965726 A | 7/2017 |
| CN | 110920475 A | 3/2020 |
| CN | 11460767 A | 6/2022 |

(Continued)

OTHER PUBLICATIONS

German Patent Office, Office Action in Application No. DE 10 2022 206 084.9, dated Nov. 3, 2022, 8 pages.

(Continued)

*Primary Examiner* — Timothy J Brindley
(74) *Attorney, Agent, or Firm* — Marshall & Melhorn, LLC

(57) ABSTRACT

A carrier structure for a backrest for a vehicle seat, has at least a carrier element, where on the carrier element at least one positioning element, in particular a pre-positioning element, is arranged on the carrier top side and has at least one opening for receiving a headrest holder. And, at least one latching element is arranged on at least one of a carrier underside and/or a lateral carrier side. A backrest and a method for mounting the backrest is also provided.

17 Claims, 4 Drawing Sheets

(56)          References Cited

FOREIGN PATENT DOCUMENTS

| DE | 102009058707 | A1 |   | 6/2011 |   |            |
|----|--------------|-----|---|--------|---|------------|
| DE | 102018208693 | A1 |   | 12/2019 |  |            |
| DE | 102023116111 | A1 | * | 12/2024 | ........... | B60N 2/7017 |
| WO | WO-2015086765 | A1 | * | 6/2015 | ........... | B60N 2/5825 |
| WO | WO-2023052716 | A1 | * | 4/2023 | ............... | B60N 2/68 |

OTHER PUBLICATIONS

China National Intellectual Property Administration, Office Action and Search Report in Application No. 202310717320.8, dated Jan. 19, 2026, 7 pages.

\* cited by examiner

BACKREST FOR A VEHICLE SEAT AND A METHOD FOR MOUNTING

FIELD

The invention concerns a backrest for a vehicle seat and a method for mounting such a backrest for a vehicle seat.

BACKGROUND

Carrier structures, for example carrier plates or so-called back plates, for backrests are known from the prior art. The respective carrier structure is attached for example to a backrest frame by means of screw connections, rivet connections and/or material-bonded connections, e.g. welding, gluing or soldering.

DE 10 2018 208 693 A1 describes a carrier module for a headrest which can be connected to a backrest.

U.S. Pat. No. 10,081,282 B2 discloses a seat backrest assembly with an inner carrier module and a seat backrest frame assembly.

U.S. Pat. No. 5,286,325 A1 describes a method for production of a vehicle seat by using material-bonded adhesion of different material layers of the vehicle seats.

The invention is based on the object of improving a backrest of the type cited initially, in particular to reduce weight, reduce component numbers and improve a easy assembly, and providing a simplified method for mounting the backrest.

The former object is achieved by a backrest with the features of the claims. The latter object is achieved by a method with the features of the claims.

SUMMARY

The carrier structure for a backrest for a vehicle seat comprises at least one carrier element. On the carrier element, at least one positioning element, in particular a pre-positioning element, is arranged on the carrier top side and has at least one opening for receiving a headrest holder, with at least one latching element which is arranged on at least one of a carrier underside and/or a lateral carrier side.

Because at least one positioning element, in particular a pre-positioning element, which is arranged on a carrier top side, is formed on the carrier element and has at least one opening for receiving a headrest holder, with at least one latching element arranged at least on a carrier underside and/or on a lateral carrier side, the weight of the backrest can be reduced compared with the backrest known from the prior art. Because of the positioning element (also called the pre-positioning element), which may simultaneously be configured as a fixing element or fastening element or holding element, and the latching element, no separate connecting elements e.g. screws are required. Because of the positioning element, in particular the pre-positioning element, an orientation of the carrier structure relative to a backrest frame of the backrest can be simplified and the structure can be pre-positioned and in some cases prefixed relative to the backrest frame.

Advantageous embodiments which may be used individually or in combination are the subject of the dependent claims.

For example, the carrier structure can be placed or superficially laid on the frame top side and then pivoted in the direction of the backrest frame and releasably fixed to the backrest frame by means of the latching element.

The positioning element may protrude perpendicularly from a plane defined by the carrier element. Because the positioning element protrudes perpendicularly from the carrier element, in particular from the carrier top side, the positioning element can easily be oriented relative to a frame top side of the backrest frame.

Because the latching element protrudes perpendicularly from the carrier element, in particular from the carrier underside and/or carrier side, the latching element can easily be oriented relative to a frame top side of the backrest frame and easily fixed to a counter-latching element on the backrest frame, in particular fixed by clamping or latching.

The positioning element may be formed as a disc and/or block. The disc form allows the positioning element to be designed with reduced weight and/or more compactly. The block-like form allows the positioning element to additionally strengthen the frame top side. The positioning element may be formed disc-like in some regions and block-like in other regions. In assembled state with the backrest frame, the positioning element may be laid compactly on and/or against the frame top side of the backrest frame. In assembled state with the backrest frame, the positioning element may reinforce the latter for carrying a headrest holder and headrest, for example provide additional stiffening. The positioning element, in particular the pre-positioning element, may form a reinforcing element for holding and carrying a headrest holder, for example a sliding sleeve.

The positioning element may be moulded onto the carrier element. The latching element may be moulded onto the carrier element. The carrier element may have at least one protrusion which forms the positioning element and/or latching element. The positioning element and/or latching element may be formed integrally with the carrier element. The positioning element and/or latching element may be embedded in the carrier element. Alternatively, the positioning element and/or latching element are/is connected to the carrier element by material bonding, force fit and/or form fit.

The positioning element may have an upper contact face and a lower contact face. The upper contact face may be configured for example as a contact face for a headrest holder and/or headrest. The lower contact face may allow the positioning element to lie flat on the frame top side of the backrest frame.

The latching element may be configured as a latching hook, a latching lug and/or a latching recess, for example in the form of a groove or channel. By means of this latching element, the carrier element can easily be connected to the backrest frame by form fit and/or force fit. For example, the latching element may be clamped, clipped, wedged, hooked or push-fitted onto the backrest frame and/or backrest frame structure and/or a counter-latching element.

At least one corresponding counter-latching element may be provided on the backrest frame and/or on the backrest frame structure. The counter-latching element may also be formed by the backrest frame itself, in particular a backrest frame portion. For example, a profiled or tubular or web-like frame underside, or a profiled or tubular or web-like frame side, may serve as a counter-latching element. Then for example a latching hook or latching lug of the carrier structure may grip around or over a profile, tube or web (=counter-latching element) of the frame underside or frame side.

The counter-latching element may be configured as a recess, channel, groove, lug, hook or loop. The counter-latching element may also be present as a contour in the backrest frame. No additional, separate fastening elements such as screws, rivets, soldering or welding structures are required. Thus the complexity and time of installation can be reduced. Optionally, additional fastening elements may be used for connecting the carrier structure to the backrest frame.

The carrier structure, in particular the carrier element, may be made of plastic. For example, the carrier element may be made of expanded polypropylene (EPP). For example, the carrier element may be made from a durable plastic. The carrier element may be an injection moulding. In some regions, the carrier element may be reinforced with metal inlays. The carrier element may have a base plate, for example made of metal. For example, the carrier element may be formed of plastic on the edge or periphery.

The positioning element may be formed integrally with the carrier element. The carrier element and the positioning element may be produced in a same method step. For example, the carrier element and positioning element may be present as injection mouldings. For example, the positioning element may be configured at least integrally with the carrier top side. Optionally, the positioning element may be attached to the carrier element, in particular the carrier top side, by material bonding, force fit and/or form fit. The positioning element may be made of plastic, e.g. a so-called EPP material. The positioning element may have damping properties. The positioning element may be formed substantially stiff and have reinforcing properties.

The latching element may be formed integrally with the carrier element. The carrier element and the latching element may be produced in a same method step. For example, the carrier element and latching element may be present as injection mouldings. For example, the latching element may be formed at least integrally with the carrier underside and/or one of the lateral carrier sides. Optionally, the latching element may be attached to the carrier element, in particular the carrier top side, by material bonding, force fit and/or form fit. The latching element may be made of plastic, e.g. a so-called EPP material. The latching element may have damping properties. The latching element may for example be reversibly flexible.

In all described embodiments, the carrier element may be formed of multiple parts or as one piece. For example, the carrier element with positioning element and latching element may be formed as an injection moulding and/or made of plastic. For example, the carrier element may have a base plate, at the edges or periphery of which are attached a carrier top side, carrier underside and two lateral carrier sides connecting the carrier top side to the carrier underside, with premounted positioning element and latching element. The carrier top side, carrier underside and carrier sides may for example form a one-piece or multipiece assembled carrier frame.

The positioning element may extend in the direction of a backrest frame, provided for example at the front. The positioning element may thus protrude perpendicularly from the carrier element, in the direction of the backrest frame provided at the front. The positioning element may be configured as a positioning arm or positioning leg.

The positioning element may be configured as a pre-positioning element which is pre-positioned for mounting to the backrest frame such that subsequent final mounting of the carrier element on the backrest frame can be simplified.

The positioning element may be configured as a pocket, loop and/or housing, and receive the headrest structure at least in portions or completely. The positioning element may have at least one receiving structure in which the headrest structure can be received by form fit and/or force fit. For example, the receiving structure may be formed in the at least one opening of the positioning element. The receiving structure may for example be a clamp structure, latching structure and/or wedge structure. The receiving structure may for example have a number of protrusions, studs, lugs and/or ribs protruding into the openings.

The positioning element may be arranged in a central region of the carrier top side. The positioning element may have two openings for respectively receiving a sliding sleeve (also called a push sleeve) of the headrest holder. The positioning element may extend over a total width of the carrier top side. The positioning element may be configured as the carrier top side.

The carrier element may form a back side of the backrest frame. The carrier element may have two positioning elements. The carrier structure may be configured as a flat or dish-like carrier element with perpendicularly protruding positioning element and latching element. Each positioning element may have an opening.

The carrier element may have multiple latching elements. The latching elements may for example be distributed along the edge or periphery of the carrier element. The carrier element may have at least one latching element on a corner side. The corner latching element may form a corner reinforcement or corner cover of the backrest frame. At least one latching element may form a latching groove or latching channel in which an edge and/or frame part of the backrest frame can be inserted, e.g. push-fitted, clipped and/or clamped.

The object is also achieved according to the invention by a backrest for a vehicle seat, comprising at least a backrest frame and a carrier structure, wherein the carrier structure comprises at least one carrier element, wherein on the carrier element at least one positioning element, in particular a pre-positioning element, is arranged on a carrier top side and has at least one opening for receiving a headrest holder, and at least one latching element is arranged on at least one of a carrier underside and/or a lateral carrier side, wherein in an assembled state of the backrest frame and the carrier structure, the positioning element lies on a frame top side and the latching element is in a latching engagement with at least a frame underside and/or lateral frame side.

The frame top side may comprise at least one sliding sleeve for receiving a rod end of the headrest holder, wherein the positioning element can be pushed onto the sliding sleeve and, on this sliding sleeve (also called a push sleeve), can be axially positioned, in particular pre-positioned, relative to the backrest frame.

The positioning element may protrude perpendicularly from a plane defined by the carrier element. Because the positioning element protrudes perpendicularly from the carrier element, in particular from the carrier top side, the positioning element can easily be oriented relative to a frame top side of the backrest frame.

Because the latching element protrudes perpendicularly from the carrier element, in particular from the carrier underside and/or carrier side, the latching element can easily be oriented relative to a frame top side of the backrest frame.

The positioning element may be placed and/or pressed onto the frame top side for pre-positioning and/or pre-fixing. Then the carrier element can easily be connected releasably or permanently to the frame underside and/or lateral frame side. For example, blind mounting may take place after pre-positioning and/or prefixing of the positioning element on the backrest frame.

The positioning element may be formed as a disc and/or block. The disc form allows the positioning element to be formed with reduced weight and/or more compactly. The block-like form allows the positioning element to additionally strengthen the frame top side. The positioning element may be formed disc-like in some regions and block-like in other regions. In assembled state with the backrest frame, the positioning element may be laid compactly on and/or against the frame top side of the backrest frame. In assembled state with the backrest frame, the positioning element may reinforce the latter for carrying a headrest holder and headrest, for example provide additional stiffening. The positioning element, in particular the pre-positioning element, may form a reinforcing element for holding and carrying a headrest holder, for example a sliding sleeve.

The positioning element may have an upper contact face and a lower contact face. The upper contact face may be configured for example as a contact face for a headrest holder and/or headrest. The lower contact face may allow the positioning element to lie flat on the frame top side of the backrest frame.

The latching element may be configured as a latching hook, a latching lug and/or a latching recess, for example in the form of a groove or channel. By means of this latching element, the carrier element can easily be connected to the backrest frame by form fit and/or force fit. For example, the latching element may be clamped, clipped, wedged, hooked or push-fitted to the backrest frame and/or a backrest frame structure and/or a counter-latching element.

The frame top side may have at least one counter-latching element. The frame underside may have at least one counter-latching element. The at least one frame side may have at least one counter-latching element. The latching element of the carrier element can easily be push-fitted, clipped and/or clamped in the counter-latching element, or vice versa. The counter-latching element may be configured as a recess, channel, groove, lug, hook or loop. The counter-latching element may also be present as a contour in the backrest frame. No additional fastening elements such as screws, rivets, soldering or welding structures are required. Thus the complexity and time of mounting can be reduced. Optionally, additional fastening elements may be used for connecting the carrier structure to the backrest frame.

The number of latching elements may vary depending on customer requirements or a structure of the backrest and/or backrest frame. The number of counter-latching elements may vary depending on customer requirements or a structure of the backrest and/or backrest frame.

The backrest frame and the carrier structure may be releasably connected together by means of a form-fit and force-fit connection, in particular a push-latch connection. For example, the backrest frame and carrier structure may be releasably connectable together in the manner of a latching seat, in particular a push-snap fit connection or push-latch connection.

The object is also achieved according to the invention by a method for mounting a backrest as described above, wherein in a first step, the positioning element of the carrier element is oriented at and/or on the frame top side of the backrest frame until the opening of the positioning element lies opposite a passage opening provided in the frame top side and/or a sliding sleeve for a headrest holder; in a second step, the positioning element is placed on the frame top side of the backrest frame and/or pressed onto the sliding sleeve; and in a third step, the carrier element is pivoted relative to the backrest frame until the latching element comes into latching engagement with the backrest frame.

After pre-positioning and/or prefixing of the positioning element on the frame top side, the carrier element can be pivoted and/or pressed relative to the backrest frame until the latching element completely latches with a counter-latching structure, in particular a counter-latching element. In other words, after the positioning element has been pre-positioned on the backrest frame, the carrier element can be folded down in the direction of the backrest frame until the latching element comes into latching engagement with at least the frame underside and/or one or both lateral frame sides.

To summarise, and in other words, the invention provides a simple backrest which can quickly be mounted, in which the carrier element, e.g. an EPP back wall, is hooked onto the backrest frame of the backrest and is clipped thereto. The opening or openings of the carrier element, in particular the positioning element, are positioned via sliding sleeves of the headrest support, wherein the at least one latching element of the carrier element is clipped onto the backrest frame from behind.

DESCRIPTION OF THE FIGURES

The invention is explained in more detail below with reference to advantageous exemplary embodiments shown in the drawings. The invention is not however restricted to these exemplary embodiments. In the drawings.

DETAILED DESCRIPTION

Figure 1:
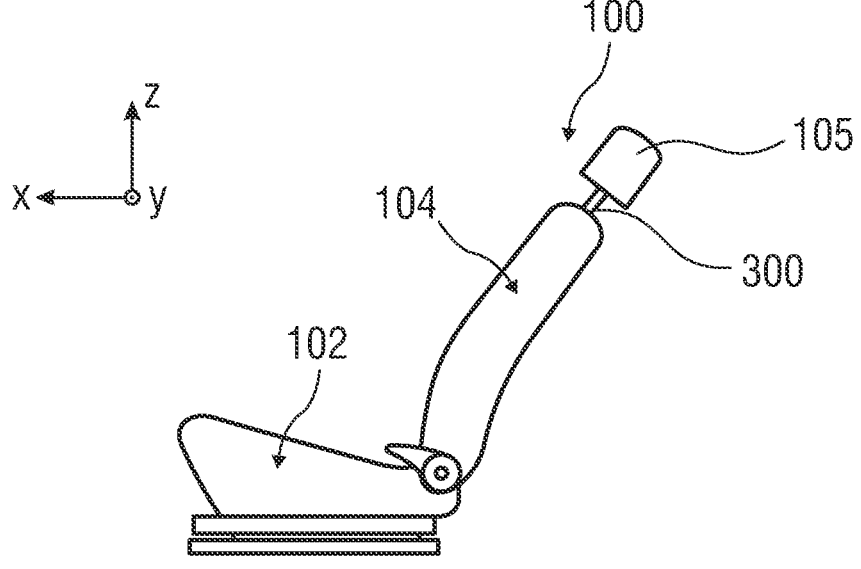
FIG. 1: shows a side view of a vehicle seat.

The vehicle seat 100, illustrated schematically in FIG. 1, is described below using three spatial directions running perpendicularly to one another. With the vehicle seat 100 installed in the vehicle, a longitudinal direction x runs largely horizontally and preferably parallel to a vehicle longitudinal direction, which corresponds to the usual direction of travel of the vehicle. A transverse direction y running perpendicularly to the longitudinal direction x is also oriented horizontally in the vehicle and runs parallel to a vehicle transverse direction. A vertical direction z runs perpendicularly to the longitudinal direction x and perpendicularly to the transverse direction y. With the vehicle seat 100 installed in the vehicle, the vertical direction z runs parallel to the vehicle's vertical axis.

The positional and directional information, such as e.g. front, rear, top, bottom and across, relate to a direction of view of an occupant sitting on a seat part 102 of the vehicle seat 100 in the usual seating position, wherein the vehicle seat 100 is installed in the vehicle in a usage position suitable for transport of persons, and with an upright backrest 104, and oriented as usual in the direction of travel. The vehicle seat 100 may however also be installed in a different orientation, for example transversely to the direction of travel.

Unless described otherwise, the vehicle seat 100 is installed mirror-symmetrically to a plane running perpendicularly to the transverse direction y.

The vehicle seat 100 may be a rear seat and/or a rear seat bench. A headrest holder 300, in particular headrest rods or a U-shaped bracket, for a headrest 105 may be attachable to the backrest 104.

Figure 2:
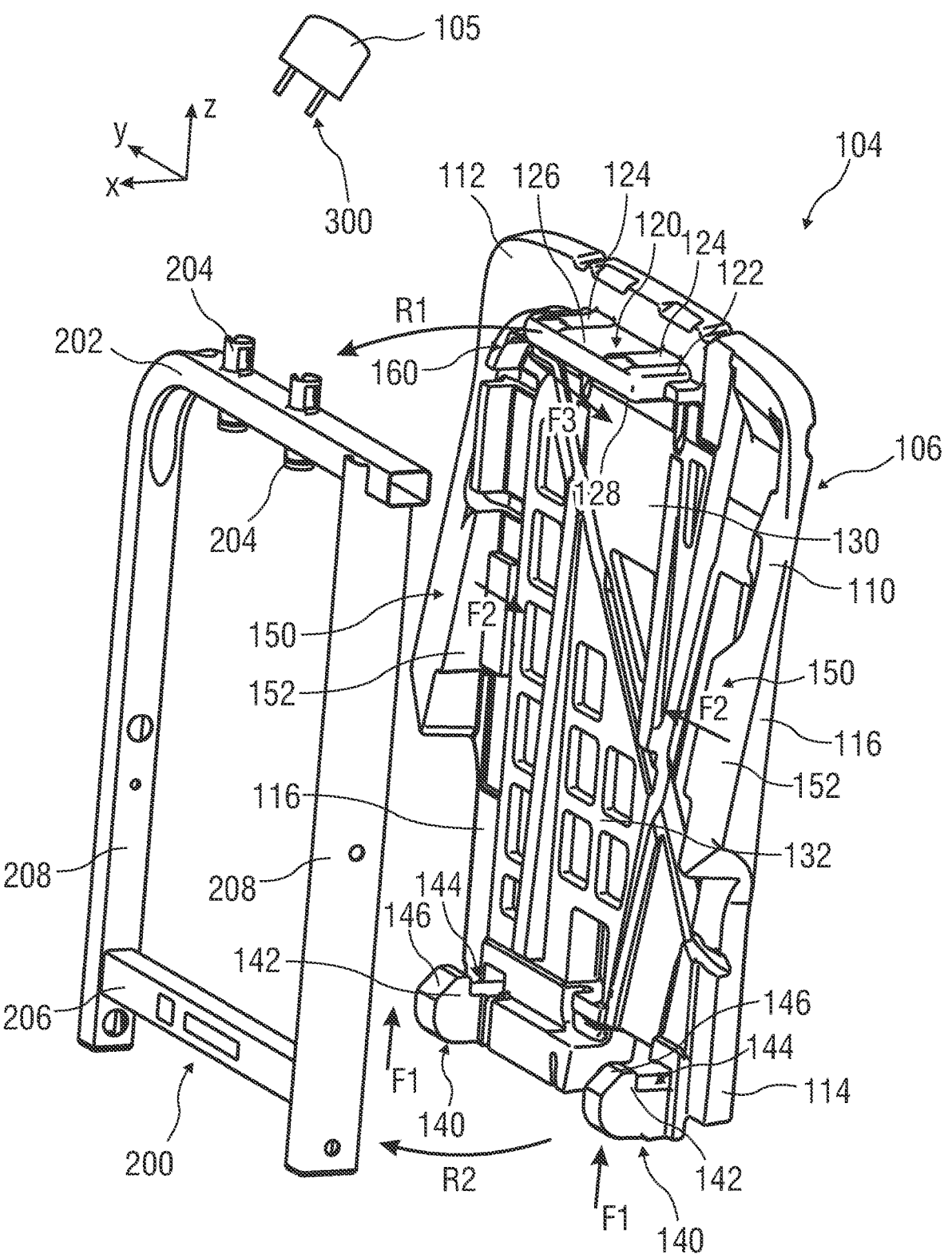
FIG. 2: shows an exploded illustration of a backrest according to the invention in one exemplary embodiment.
Figure 3:
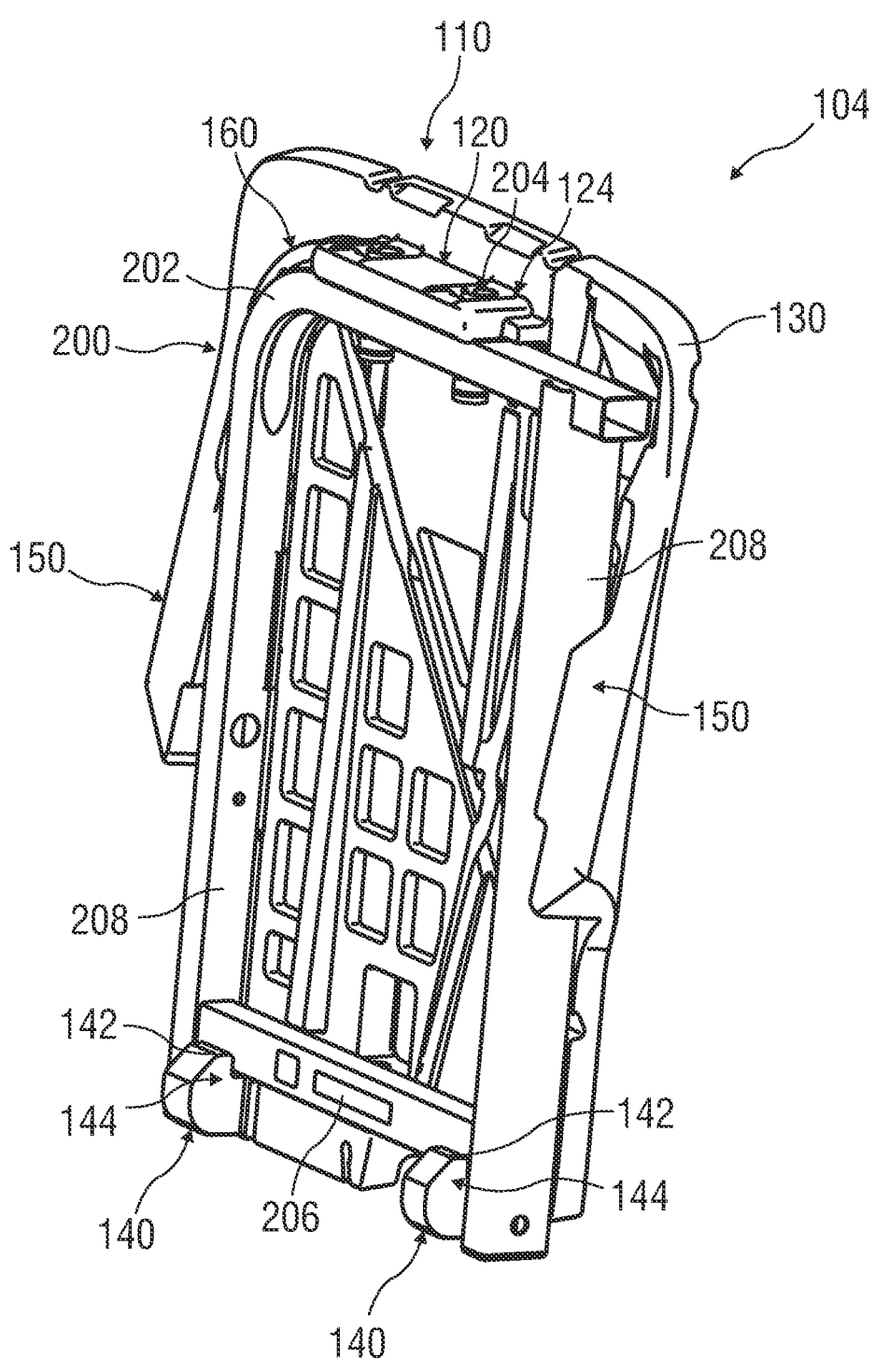
FIG. 3: shows a perspective view of the backrest according to the invention in an assembled state, according to the exemplary embodiment.

FIGS. 2 and 3 show a backrest 104 according to the invention in a first exemplary embodiment, in which the backrest 104 is shown without upholstery and/or covering elements.

The backrest 104 comprises a carrier structure 106 and a backrest frame 200. The carrier structure 106 forms a back wall for the backrest 104. The carrier structure 106 is connected to the backrest frame 200 to form a backrest structure. After mounting of the backrest structure, this may be provided with upholstery and a cover.

FIG. 2 shows an exploded view of the backrest 104 according to the invention in non-assembled state.

The carrier structure 106 comprises a carrier element 110 on which a positioning element 120, in particular a pre-positioning element 122, is arranged on a carrier top side 112 and has two openings 124 for receiving a headrest holder 300. The positioning element 120 protrudes perpendicularly from a plane defined by the carrier element 110.

The positioning element 120 is formed as a block. Alternatively, the positioning element 120 may be formed as a disc. The positioning element 120 has an upper contact face 126. The upper contact face 126 may serve to support a headrest body, for example in a lowered position. Furthermore, the positioning element 120 has a lower contact face 128.

In the assembled state with the backrest frame 200, as shown in FIG. 3, the lower contact surface 128 lies on a frame top side 202.

FIG. 3 shows a perspective view of the backrest 104 according to the invention in an assembled state.

The frame top side 202 comprises two sliding sleeves 204, in particular rod sleeves, for receiving rod ends of the headrest holder 300. The sliding sleeves 204 may be configured as push sleeves for the headrest holder 300. The sliding sleeves 204 pass through the frame top side 202 and may protrude from the backrest frame 200 on one or both sides. Alternatively, the sliding sleeves 204 may terminate flush with an upper and/or lower side face of the frame top side 202. For example, the sliding sleeves 204 may protrude only upward or downward on the frame top side 202.

For pre-positioning of the carrier element 110 on the backrest frame 200, the positioning element 120 and hence the carrier element 110 are oriented relative to the frame top side 202 and hence the backrest frame 200 such that the sliding sleeves 204 can be introduced into the openings 124 of the positioning element 120, in particular the pre-positioning element 122. When the sliding sleeves 204 are introduced into the openings 124, the lower contact face 128 of the positioning element 120 can be laid flat on the frame top side 202.

Alternatively, for example with the sliding sleeves 204 protruding downward, the positioning element 120 may be brought onto the frame top side 202 from below and oriented such that the sliding sleeves 204 can be introduced into the openings 124. When the sliding sleeves 204 are introduced into the openings 124, the upper contact surface 126 of the positioning element 120 may be laid flat against the lower side face of the frame top side 202.

By contact of the contact face 128 against and/or on the frame top side 202, the positioning element 120 may be pre-positioned for mounting.

In the exemplary embodiment shown, for pre-positioning and/or prefixing of the carrier element 110, the positioning element 120 may be pushed forward and/or placed on the sliding sleeves 204 from above in the push-fit direction R1 (also called the positioning direction). The sleeve portions of the sliding sleeves 204 protruding beyond the backrest frame 200 may be pushed into the openings 124 or pass completely through the openings 124.

Then for form-fit and/or force-fit and releasable connection of the backrest frame 200 and carrier structure 106, the carrier structure 106 can then be moved, for example folded and pivoted, relative to the backrest frame 200 in the pressing direction R2 (also called the fixing direction). In particular, the carrier structure 106 is moved until the backrest frame 200 and the carrier structure 106 come into a form-fit and/or force-fit engagement, in particular a releasable latching or clamping engagement. Thus the backrest frame 200 and the carrier structure 106 can be fixed together releasably and without tools in a push-latch connection or push-clamp connection.

The carrier element 110 comprises a carrier underside 114 and two lateral carrier sides 116. The carrier sides 116 connect the carrier underside 114 to the carrier top side 112.

The carrier element 110 may be formed for example from a so-called EPP material. The carrier element 110 comprises a carrier body 130. The carrier body 130 is a flat carrier plate. The carrier body 130 comprises a support structure 132, for example in the form of support ribs. Alternatively, the carrier element 110 may be formed as a frame and be formed by the carrier top side 112, the carrier underside 114, and two lateral carrier sides 116 connecting the carrier top side 112 and carrier underside 114.

Furthermore, multiple latching elements 140 are formed on the carrier element 110, in particular on its carrier body 130. The number of latching elements 140 may vary. In the exemplary embodiment shown, two latching elements 140 are shown. Alternatively, fewer or more latching elements 140 may be provided, and/or at different places on the carrier element 110.

The carrier underside 114 comprises first latching elements 140. The first latching elements 140 are configured as latching hooks 142 or comprise latching hooks 142. The first latching elements 140 protrude perpendicularly from the plane defined by the carrier element 110. The first latching elements 140 are formed substantially I-shaped or J-shaped. The latching hooks 142 point upward and have a latching recess 144 in which a frame underside 206 can be push-fitted, as shown in FIG. 3. The latching recess 144 is formed between the latching hook 142 and the carrier body 130. The latching elements 140 are arranged spaced apart from one another in the transverse direction. Alternatively or optionally, also the carrier underside 114 and/or the lateral carrier sides 116 may have a number of latching elements 140 formed as latching hooks 142.

In a derivative of the first exemplary embodiment, the latching elements 140 may be configured integrally and form a continuous latching recess 144 in the form of a channel or groove along the transverse extent of the carrier underside 114. Alternatively, the first latching elements 140 may be U-shaped, wherein one leg is attached to the carrier element 110, in particular the carrier body 130, wherein the other leg serves as a hook for holding the backrest frame 200, and a web connecting the legs forms the latching recess 144 for receiving the backrest frame 200 by form fit.

The backrest frame 200 may for example have counter-latching elements. Preferably, the backrest frame 200 is itself configured as a counter-latching element. For example, a portion of the backrest frame 200 may form the counter-latching element. In particular, a portion of the frame underside 206 or a portion of one of the frame undersides 208, configured as a profile or tube or web, may form the counter-latching element. For example, the latching element

140 may engage around or over the profile, tube or web (=counter-locking element) of the frame underside 206 or frame side 208.

The first latching elements 140 are flexible. The latching elements 140 may be made of plastic. The latching elements 140 may be spring-loaded.

For simpler insertion and latching of the frame underside 206 in the latching recess 44, the first latching elements 140, in particular the latching hooks 142, have angled edges 146, e.g. in the form of slopes. When the carrier element 110 is pre-positioned and prefixed to the backrest frame 200 via the positioning element 120, the carrier element 110 can be moved in the pressing direction R2, e.g. folded and pivoted, such that the frame underside 206 travels over the angled edges 146 and pushes away the corresponding latching elements 140, in particular the latching hooks 142, against their spring force F1 and/or clamping force, until the frame underside 206 is arranged, in particular clamped, in the latching recesses 144. In mounted i.e. assembled state, the first latching elements 140 are in latching engagement with the backrest frame 200. The frame underside 206 is clamped or clipped between the latching elements 140 and the carrier body 130.

Alternatively, additionally or optionally, the carrier element 110 has side second latching elements 150. For example, the second latching elements 150 may be configured as side latching wings 152 and/or latching legs and/or latching arms. The second latching elements 150 may be arranged on the outer periphery of the carrier body 130 and form support wings or support legs, reinforcing wings or reinforcing legs for the backrest frame 200. The second latching elements 150 may for example have a spring force F2 and/or clamping force which is directed inward in the direction of the carrier body centre and, in assembled state of the carrier element 110 with the backrest frame 200, acts on lateral frame sides 208 of the backrest frame 200. In the assembled state, the second latching elements 150 lie flat on the lateral frame sides 208. The second latching elements 150 may be flexible. The second latching elements 150 may have angled edges, for example in the form of slopes.

Alternatively, additionally or optionally, the carrier element 110 may have at least one third latching element 160 which is situated in a transitional region, in particular a corner region, between the carrier side 116 and carrier top side 112 and/or carrier underside 114, and in assembled state, acts with its spring force F3 on a transitional region or corner region of the backrest frame 200.

In a derivative of the first exemplary embodiment, multiple latching elements 140, 150, 160 may be formed on the carrier element 110, in particular on its carrier body 130. The number and/or position of the latching elements 140, 150, 160 may vary. For example, the carrier top side 112 may have fourth latching elements (not shown in detail) spaced from the positioning element 120. The fourth latching elements may form latching recesses in which a respective one of the sliding sleeves 204 can be inserted or introduced, for example for latching engagement.

In a derivative of the first exemplary embodiment, the backrest frame 200 may have counter-latching elements (not shown in detail). For example, the counter-latching elements may be formed as recesses, hooks, channels, grooves, lugs or loops. The counter-latching elements may be distributed on the backrest frame 200 such that a position of the counter-latching elements corresponds to the position of the latching elements 140, 150, 160. The counter-latching elements may be formed for example as protrusions and/or recesses and/or projections and/or channels on the frame parts (frame top side 202, frame underside 206, lateral frame side 208).

In a further derivative of the exemplary embodiment shown, the carrier element 110 may have inner latching elements 140, 150, 160 which come into latching engagement with an inner peripheral face of the backrest frame 200.

Figure 4:
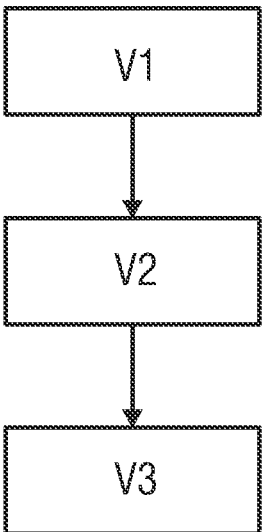
FIG. 4: shows a block diagram of a method for mounting a backrest according to the invention in one exemplary embodiment.

FIG. 4 shows a block diagram of a method for mounting a backrest 184 according to the invention in one of the exemplary embodiments.

In a first step V1, the positioning element 120 of the carrier element 110 is oriented on and/or against the frame top side 202 of the backrest frame 202 until the openings 124 of the positioning element 120 are arranged opposite passage openings provided in the frame top side 202 and/or sliding sleeves 204. In a second step V2, the positioning element 120 is placed on the frame top side 202 of the backrest frame 200 and/or pushed onto the sliding sleeves 204. After the second step V2, the carrier element 110 is pre-positioned and/or prefixed on the backrest frame 200 by means of the positioning element 120. In a third step V3, the carrier element 110 is pivoted relative to the backrest frame 200 until the latching elements 140, 150, 160 come into latching engagement with the backrest frame 200.

In particular, the carrier element 110 is fastened to the backrest frame 200 without tools.

LIST OF REFERENCE SIGNS

100 Vehicle seat
102 Seat part
104 Backrest
105 Headrest
106 Carrier structure
110 Carrier element
112 Carrier top side
114 Carrier underside
116 Carrier side
120 Positioning element
122 Pre-positioning element
124 Opening
126 Contact face
128 Contact face
130 Carrier body
132 Support structure
140, 150, 160 Latching element
142 Latching hook
144 Latching recess
146 Edge
152 Latching wing
200 Backrest frame
202 Frame top side
204 Sliding sleeve
206 Frame underside
208 Frame side
300 Headrest holder
F1 to F3 Spring force
R1 Push-fit direction
R2 Pressing direction
V1 to V3 Step
x Longitudinal direction
y Transverse direction
z Vertical direction

What is claimed is:

1. A backrest for a vehicle seat, comprising:
   a backrest frame with a frame top side and a frame underside and two lateral frame sides which each connect together the frame top side and frame underside, and
   a carrier structure which forms a back wall of the backrest and can be releasably connected to the backrest frame, wherein the carrier structure comprises at least one carrier element,
wherein the carrier element has at least a carrier underside, a carrier top side and two lateral carrier sides, wherein on the carrier element,
   at least one positioning element is arranged on the carrier top side and has at least one opening for receiving a headrest holder, and
   at least one latching element is arranged on at least one of the following carrier sides of the carrier underside and one of the lateral carrier sides,
wherein via the positioning element, the carrier structure is orientable on the frame top side and positionable relative to the backrest frame and can then be releasably connected by the latching element to the backrest frame at one of the following carrier sides of the frame underside and one of the lateral frame sides,
wherein the at least one latching element is configured as a hook with a latching recess to engage the backrest frame.

2. The backrest according to claim 1, wherein the carrier structure can be placed or superficially laid onto the frame top side and then pivoted in the direction of the backrest frame and releasably fixed to the backrest frame by the latching element.

3. The backrest according to claim 1, wherein the positioning element and the latching element protrude perpendicularly from a plane defined by the carrier element.

4. The backrest according to claim 1, wherein the positioning element is formed as a disc and/or block.

5. The backrest according to claim 1, wherein the positioning element has an upper contact face and a lower contact face.

6. The backrest according to claim 1, wherein at least the carrier element is made of plastic.

7. The backrest according to claim 1, wherein the positioning element and/or the latching element are/is formed integrally with the carrier element.

8. The backrest according to claim 1, wherein in an assembled state of the backrest frame and the carrier structure, the positioning element lies on or against the frame top side and the latching element is in a latching engagement with at least one of the following frame sides of the frame underside and one of the lateral frame sides.

9. The backrest according to claim 1, wherein the frame top side comprises at least one sliding sleeve or push sleeve for receiving a rod end of the headrest holder.

10. The backrest according to claim 9, wherein the positioning element is orientable relative to the backrest frame by its opening and then is pushable or pushed onto the sliding sleeve or push sleeve and, on this sliding sleeve or push sleeve, is axially positionable or positioned relative to the backrest frame.

11. The backrest according to claim 1, wherein the backrest frame and the carrier structure are releasably connected together by a push-latch connection.

12. The backrest according to claim 1, wherein a latching lug or a latching hook of the carrier structure engages by latching in a counter-receiver or counter-web of the backrest frame.

13. The backrest according to claim 1, wherein the positioning element is vertically distal from an upper edge portion of the carrier element.

14. The backrest according to claim 1, wherein the latching element engages a lower bar extending between two sides of the bracket frame.

15. The backrest according to claim 14, wherein the latching element engages the lower bar via a spring force.

16. The backrest according to claim 1, comprising a first latching element and a second latching element, wherein the first latching element comprises a latching recess between the carrier element and an upwardly extending hook of the first latching element, and the second latching element comprises a latching recess between the carrier element and an upwardly extending hook of the second latching element.

17. A method for mounting a backrest, wherein
   in a first step, a backrest frame, a carrier element, a positioning element arranged on the carrier element and a latching element, configured as a hook with a receiving channel, arranged on the carrier element are provided,
   in a second step, the positioning element of the carrier element is oriented at and/or on a frame top side of the backrest frame until an opening of the positioning element is arranged opposite a passage opening provided in the frame top side and/or a sliding sleeve or push sleeve for a headrest holder,
   in a third step, the positioning element is placed on the frame top side of the backrest frame and/or pressed onto the sliding sleeve or push sleeve, and
   in a fourth step, the carrier element is pivoted relative to the backrest frame until the latching element comes into latching engagement with a frame underside and/or one of a number of lateral frame sides of the backrest frame.

* * * * *